(12) United States Patent
Gift

(10) Patent No.: US 6,349,786 B1
(45) Date of Patent: Feb. 26, 2002

(54) EMERGENCY STOPPING SYSTEM FOR CHILD'S POWERED RECREATIONAL VEHICLE

(75) Inventor: J. Paul Gift, Mesa, AZ (US)

(73) Assignee: F. F. Acquisition Corp., West Point, MS (US)

( * ) Notice: Subject to any disclaimer, the term of this patent is extended or adjusted under 35 U.S.C. 154(b) by 0 days.

(21) Appl. No.: 09/498,198

(22) Filed: Feb. 4, 2000

(51) Int. Cl.[7] .............................................. B60R 21/00
(52) U.S. Cl. ...................................... 180/271; 180/272
(58) Field of Search ................................ 180/271, 272, 180/279; 200/43.01, 43.03, 43.04, 51 LM, 52 R, 61.59, 330, 331, 334

(56) References Cited

U.S. PATENT DOCUMENTS

| | | | | |
|---|---|---|---|---|
| 3,676,750 A | * | 7/1972 | Hawks | 200/61.59 |
| 3,728,674 A | * | 4/1973 | Kahn | 340/63 |
| 3,889,089 A | | 6/1975 | Tomlin | 200/334 |
| 3,938,613 A | | 2/1976 | Raborn | 180/99 |
| 4,037,683 A | | 7/1977 | LeBell | 180/99 |
| 4,209,075 A | | 6/1980 | Messina | 180/268 |
| 4,213,513 A | * | 7/1980 | Beck | 180/272 |
| 4,431,038 A | * | 2/1984 | Rome | 200/61.59 |
| 4,570,078 A | * | 2/1986 | Yashima et al. | 307/10 R |
| 4,636,604 A | | 1/1987 | Gomes, Jr. | 200/331 |
| 4,762,968 A | | 8/1988 | Hilton | 200/52 |
| 5,156,232 A | * | 10/1992 | Muroya et al. | 180/273 |
| 5,195,606 A | | 3/1993 | Martyniuk | 180/272 |
| 5,423,393 A | | 6/1995 | Felt | 180/22 |
| 5,595,257 A | * | 1/1997 | Yoshida et al. | 180/287 |
| 5,602,426 A | * | 2/1997 | Ecker | 307/10.2 |
| 5,706,909 A | | 1/1998 | Bevins et al. | 180/273 |
| 5,942,988 A | * | 8/1999 | Snyder et al. | 340/825.69 |

* cited by examiner

Primary Examiner—J. J. Swann
Assistant Examiner—L. Lum
(74) Attorney, Agent, or Firm—Brinks Hofer Gilson & Lione

(57) ABSTRACT

A child's powered recreational vehicle with an emergency stopping mechanism is provided. A combination of child's powered recreational vehicle with an emergency stopping mechanism is provided. A method of stopping a child's running powered recreational vehicle is also provided.

16 Claims, 2 Drawing Sheets

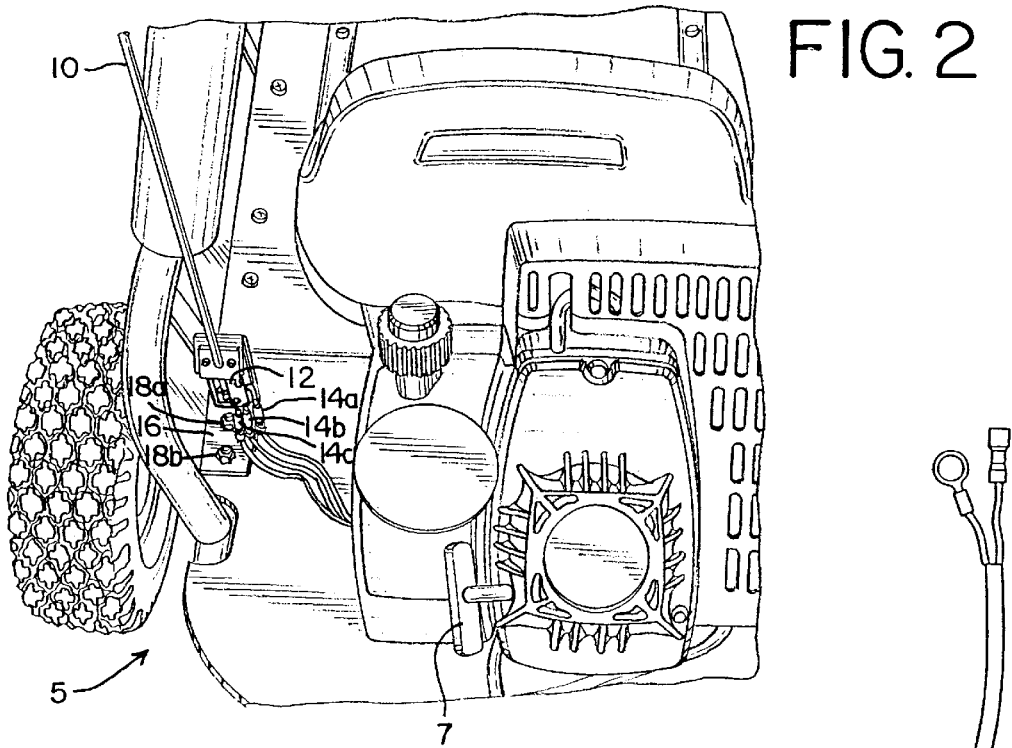
FIG. 2
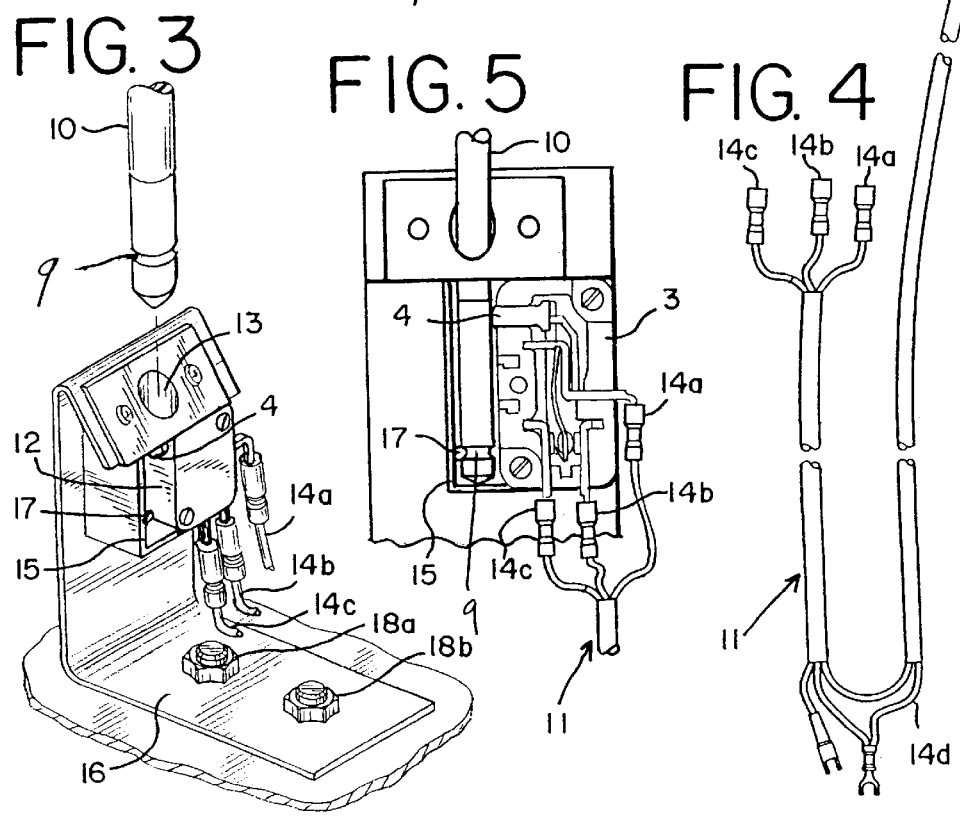
FIG. 3
FIG. 5
FIG. 4

EMERGENCY STOPPING SYSTEM FOR CHILD'S POWERED RECREATIONAL VEHICLE

BACKGROUND OF THE INVENTION

The field of the invention is an emergency stopping system for a child's recreational vehicle. In particular, the present invention provides an emergency stopping system for a child's powered vehicle.

Children enjoy riding on powered recreational vehicles. Because children have a limited set of experiences, they might not know to stop the vehicle when a dangerous situation presents itself. Also, because children have limited coordination and dexterity, they might not be able to stop the vehicle quickly enough in situations where they know they should stop the vehicle. For these reasons, it is desirable for an adult or an older child to be able to quickly stop the vehicle.

Some recreational vehicles have stopping devices attached to passengers such that when a passenger falls out of the vehicle, the stopping device goes with the passenger, cutting off the supply of power to the vehicle. The problem with these stopping devices is that they are not preventative of danger. A child must fall out before the power supply is cut off. For this reason, a mechanism for stopping the vehicle before the child falls out is desired. For example, it is desired that as soon as a supervisory person recognizes danger, the supervisory person can cut off the power supply to the vehicle.

Some other recreational vehicles have stopping devices attached to a supervisory person outside the vehicle. The problem with these devices is that the supervisory person needs to stay alongside the vehicle the entire time the vehicle is moving. It is desirable for a supervisory person to have greater flexibility and a wider range of motion than is allowed by a physical attachment to a stopping device on a vehicle.

SUMMARY OF THE INVENTION

The design of the present invention overcomes many of the above-identified problems with existing emergency stopping systems for children's powered recreational vehicles.

In one aspect of the invention, a child's powered recreational vehicle comprises a power supply that powers the vehicle, and an emergency stopping mechanism. The emergency stopping mechanism comprises an electrical kill switch on the vehicle. The switch has a first position wherein the power supply is permitted to power the vehicle, and a second position wherein the power supply is not permitted to power the vehicle. There is a switch-flipping mechanism on the vehicle such that it the mechanism is accessible to persons outside the vehicle, but the mechanism is detached from persons outside the vehicle.

In another aspect of the invention, a combination of a child's powered recreational vehicle and an emergency stopping mechanism is provided. The emergency stopping mechanism comprises an electrical kill switch on the vehicle. The switch has a first position wherein the powered vehicle is permitted to run and a second position wherein the powered vehicle is not permitted to run. There is a switch-flipping mechanism on the vehicle such that the mechanism is accessible to persons outside the vehicle, but the mechanism is detached from persons outside the vehicle during normal operation of the vehicle.

In another aspect of the invention, a method of stopping a child's running powered recreational vehicle is provided. The method involves providing a running powered recreational vehicle with a kill switch, the switch having a first position wherein the vehicle remains running and a second position wherein power is terminated. The method involves monitoring operation of the vehicle without having continuous physical contact with the vehicle. The method further involves flipping the kill switch using a switch-flipping mechanism on the vehicle from outside the vehicle, whereby power is immediately cut off.

The present invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF SEVERAL VIEWS OF THE DRAWINGS

FIG. 2 is a rear partial perspective view of the vehicle in FIG. 1.

FIG. 3 is a view of the switch-flipping mechanism on the vehicle in FIG. 1.

FIG. 4 shows the wires that connect the switch-flipping mechanism to the power system of the vehicle in FIG. 1.

FIG. 5 shows the wires of FIG. 4 attached to a microswitch.

DETAILED DESCRIPTION OF THE DRAWINGS AND PREFERRED EMBODIMENTS

Figure 1:
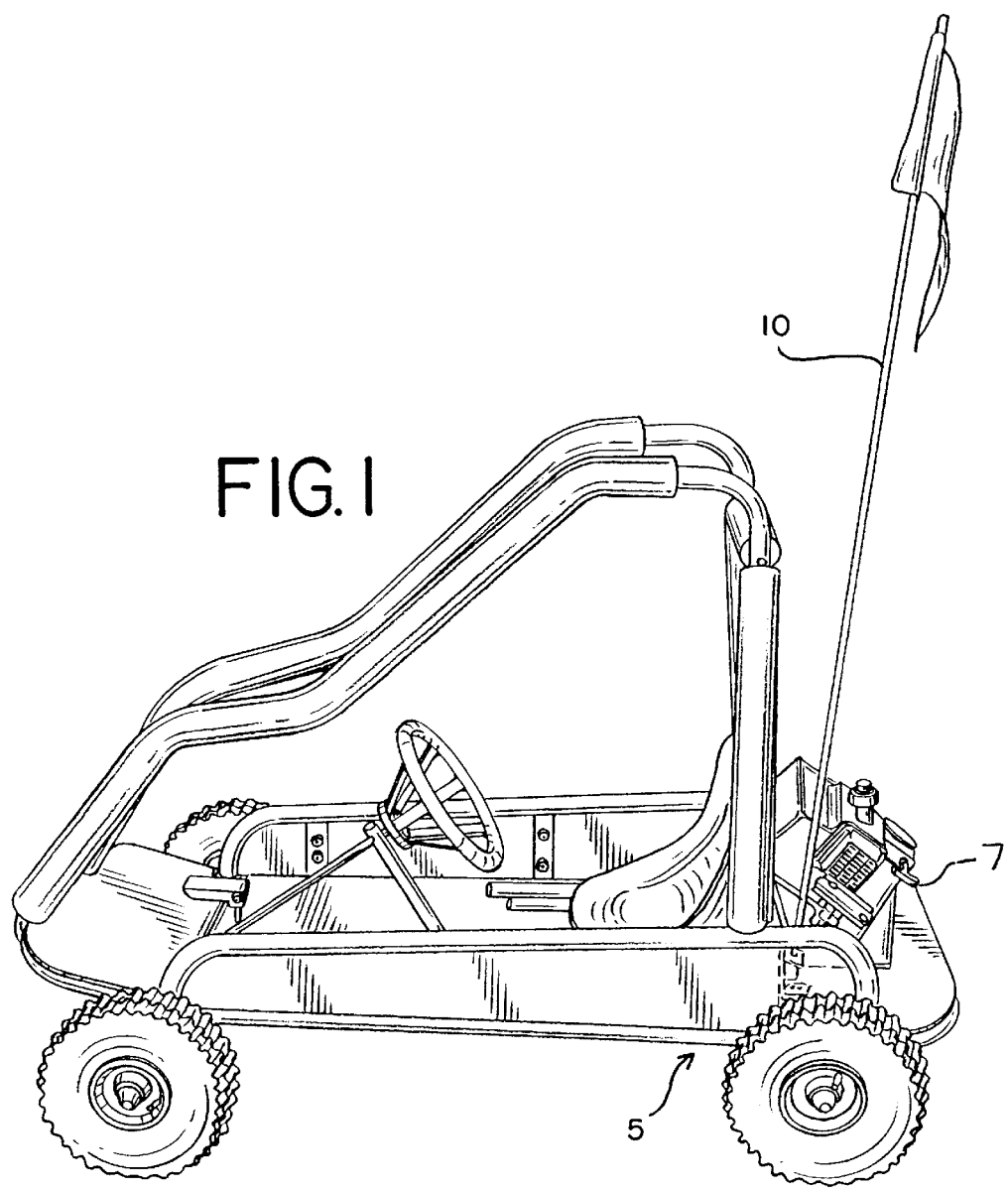
FIG. 1 is a side perspective view of a preferred child's powered recreational vehicle.

Referring to FIG. 1, a preferred powered recreational vehicle 5 is shown. In particular, a go-cart is shown. The vehicle 5 has a flagpole 10. When vehicle 5 is running, and flagpole 10 is pulled from vehicle 5, power is immediately cut off, which causes vehicle 5 to stop. This is the nature of the preferred embodiment of the emergency stopping system.

Vehicle 5 can be powered by gas or electricity. Vehicle 5 can have from about 1 to about 10 horsepower, preferably from about 2 to about 5 horsepower, and most preferably about 2 horsepower. The preferred embodiment of vehicle 5 shown in FIG. 1 is gas powered. More preferably, vehicle 5 has a TECUMSEH two-stroke engine 50. An example of a TECUMSEH two-stroke engine is described in U.S. Pat. No. 4,252,092, which is assigned to the Tecumseh Products Company. This patent is incorporated by reference in its entirety.

Referring to FIGS. 2, 3, 4, and 5, a preferred embodiment of a switch-flipping mechanism attached to vehicle 5 is shown. Bracket 16 holds microswitch housing 12 on to vehicle 5. Microswitch 3 is secured in or on microswitch housing 12. Any method known for securing a microswitch 3 in a housing 12 is within the scope of this invention. These include but are not limited to screws, adhesives, and other well-known securing mechanisms. Opposite microswitch 3 is wall 15, which defines cavity 13 between microswitch 3 and wall 15. Flagpole 10 fits into cavity 13. When flagpole 10 is in microswitch housing 12, flagpole 10 is held in place by housing 12, wall 15, and boss 17. Flagpole 10 has groove 9 into which boss 17 fits for a snug fit.

Bracket 16 secures microswitch housing 12 onto vehicle 5, and bracket 16 is secured onto vehicle 5 by fasteners 18a and 18b. Any mechanism for fastening the microswitch housing 12 onto vehicle 5 is within the scope of this invention. This includes but is not limited to adhesives, screws, welded connections, and other fastening means well known to those in the art.

Microswitch 3 is preferably of the kind that is commercially available such as Microswitch #V7-1V19E9, which is manufactured by Honeywell, Inc. in Freeport, Ill. Many other microswitches known to those of skill in the art could be used with the recreational vehicle of the present invention.

Switch flipping occurs as follows: pulling flagpole 10 out of cavity 13 flips microswitch 3 so that vehicle 5 cannot run, and inserting flagpole 10 into cavity 13 flips microswitch 3 so that vehicle 5 can run. When the flagpole 10 is in cavity 13, microswitch 3 is in a first position (button 4 is depressed), and the engine 50 in vehicle 5 is permitted to run. When flagpole 10 is removed from microswitch housing 12, the microswitch 3 is flipped into its second position (button 4 is extended), and current runs through wire assembly 11 to a ground. In this case, the spark plug is grounded. Then, the engine 50 cannot run. In other words, flagpole 10 is a switch activator. Other switch activators are within the scope of this invention. As a non-limiting example, a lever could be used.

Figure 6:
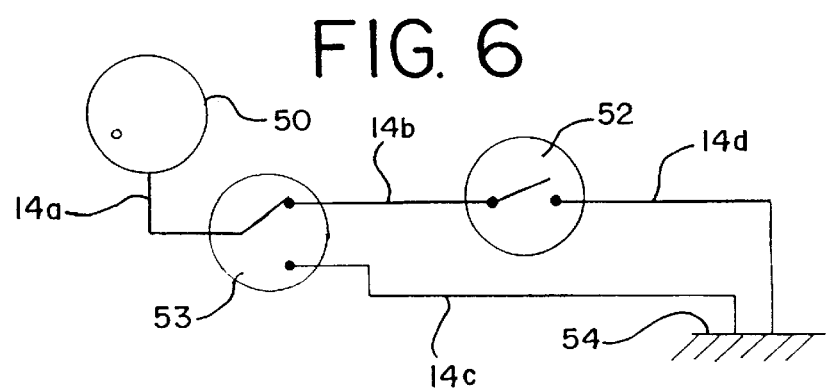
FIG. 6 is an electrical schematic showing the circuit for the electrical system the vehicle in FIG. 1.

Referring to FIGS. 4, 5, and 6, wire assembly 11 has 4 wires: wire 14a, wire 14b, wire 14c, and wire 14d. Wire 14a connects the engine 50 to the microswitch 3, a schematic representation of which is drawn in FIG. 6 as switch 53. Wire 14b connects the kill switch 53 to the on-off switch 52. Wire 14c connects the switch to ground. Wire 14d connects the on-off switch to ground.

Referring to FIG. 6, engine 50 generates a current that allows vehicle 5 to run. When the flagpole 10 is placed through cavity 13 adjacent to microswitch 3 and button 4 is depressed, switch 53 is in the position illustrated. In this position, the vehicle 5 is permitted to run—electricity flows through wires 14a and 14b.

When flagpole 10 is removed from cavity 13, button 4 on microswitch 3 is extended. This makes switch 53 change position, and electricity flows from wire 14a through wire 14c to ground 54. This cuts off the power supply to vehicle 5.

Switch 52 is also shown in FIG. 6 as allowing vehicle 5 to run. That is, electricity flows through wires 14a and 14b. This is the position that switch 52 takes when the child passenger or a supervisory person turns on vehicle 5. This can be done by pulling a rope, turning a key, moving a lever, pushing a button, stepping on a foot pedal, or any other means known in the art.

In a non-emergency situation, the child passenger can turn off vehicle 5 in a way that causes switch 52 to change position from the one depicted in FIG. 6. This can be done by turning a key, moving a lever, pushing a button, releasing pressure from or applying pressure to a foot pedal, or any other means known in the art. When switch 52 changes position, electricity flows through wires 14a to ground 54. This grounds a spark plug in engine 50 and cuts off the power supply to vehicle 5.

Method of Using the Preferred Embodiments

Referring to FIG. 1, a child can sit in vehicle 5. A supervisory person starts engine 50, which turns on switch 52, by pulling rope 7. Then, the child can drive vehicle 5. A supervisory person can watch the child drive from a nearby position. Preferably, the person is less than about 30 feet from vehicle 5. More preferably, the person is less than about 20 feet from vehicle 5. Most preferably, the person is less than about 10 feet from the vehicle 5. The distance is not so important, so long as the switch-flipping mechanism is accessible to the supervisory person. "Accessible" means that the supervisory person can flip the switch in a reasonable time after having spotted a reason to do so. If the switch 53 mechanism can be flipped by remote control, the switch-flipping mechanism is "accessible" from a much further distance than if switch 53 is flipped by physical means, as in the preferred embodiments depicted in FIGS. 1–6.

Advantageously, the person is not attached to vehicle 5 or any detachable part of vehicle 5 by a rope, string, or any other means during the normal operation of vehicle 5. In other words, the person is not in continuous physical contact with vehicle 5. Instead, the person has a free range of movement.

Because flagpole 10 is fairly long, the supervisory person does not need to stand next to the vehicle 5 as it runs. For this reason, it is advantageous for flagpole 10 to be of sufficient length so that it can be reached from a distance. Flagpole 10 can be from 1 foot to 12 feet, preferably from 2 feet to 10 feet, and more preferably from 3 feet to 8 feet in length.

If the child starts heading for trouble, the supervisory person who is near the vehicle 5 can simply pull flagpole 10 from cavity 13, so that flagpole 10 is no longer contacting microswitch 3. This causes button 4 to extend, which flips the switch 53 shown in FIG. 6. This grounds the spark plug and cuts off the power, and the vehicle 5 comes to a stop.

SCOPE OF INVENTION

It should be appreciated that the apparatus of the present invention is capable of being incorporated in the form of a variety of embodiments, only some of which have been described above. The invention may be embodied in other forms without departing from its spirit or essential characteristics. For example, a remote control device similar to those used on toy cars could be used to flip switch 53. The described embodiments are to be considered in all respects only as illustrative and not restrictive, and the scope of the invention is therefore indicated by the appended claims rather than by the foregoing description. All changes that come within the meaning and range of equivalency of the claims are embraced to be within their scope.

What is claimed is:

1. A child's powered recreational vehicle comprising:
    a) a power supply that powers the vehicle; and
    b) an emergency stopping mechanism comprising an electrical kill switch on the vehicle, the switch having a first position wherein the power supply is permitted to power the vehicle and a second position wherein the power supply is not permitted to power the vehicle, and a switch-flipping mechanism on the vehicle such that the mechanism is accessible to and detached from persons, outside the vehicle during operation and not readily accessibl a passenger in the vehicle.

2. The recreational vehicle of claim 1 wherein the vehicle is gas powered.

3. The recreational vehicle of claim 1 wherein the vehicle is electrically powered.

4. The recreational vehicle of claim 1 wherein the switch-flipping mechanism comprises a support mechanism, a microswitch, a cavity between the support mechanism and microswitch, and switch activator insertable into the cavity such that when the switch activator is inserted in the cavity, the switch is in the first position and when the switch activator is not in the cavity, the switch is in the second position.

5. The recreational vehicle of claim 4 wherein the switch activator is a flagpole.

6. The recreational vehicle of claim 4 wherein the switch activator is a lever.

7. In combination with a child's powered recreational vehicle, an emergency stopping mechanism comprising:
   a) an electrical kill switch on the vehicle, the switch having a first position wherein the powered vehicle is permitted to run and a second position wherein the powered vehicle is not permitted to run; and
   b) a switch-flipping mechanism on the vehicle such that the mechanism is accessible to, and is detached from, persons outside the vehicle during operation of the vehicle and not readily accessible to a passenger in the vehicle.

8. A method of stopping a child's running powered recreational vehicle, comprising:
   providing a running powered recreational vehicle with a kill switch, the switch having a first position wherein the vehicle remains running and a second position wherein power is terminated;
   monitoring operation of the vehicle without having continuous physical contact with the vehicle; and
   flipping the kill switch using a switch-flipping mechanism on the vehicle from outside the vehicle, whereby power is immediately cut off,
   wherein the mechanism is accessible to, but detached from, persons outside the vehicle, and not readily accessible to a passenger in the vehicle.

9. The method of claim 8 wherein the powered recreational vehicle is a go-cart.

10. The method of claim 8 wherein the recreational vehicle is gas-powered.

11. The method of claim 8 wherein the recreational vehicle is electrically powered.

12. The method of claim 8 wherein the switch-flipping mechanism comprises a support mechanism, a microswitch, a cavity between the support mechanism and microswitch, and activator insertable into the cavity such that when the switch activator is inserted in the cavity, the switch is in the second position.

13. The method of claim 12 wherein the switch activator is a flagpole.

14. The method of claim 12 wherein the switch activator is a lever.

15. The method of claim 13 wherein flipping the kill switch comprises disengaging the flagpole from the cavity.

16. The method of claim 15 wherein the disengaging the flagpole from the cavity cuts off power by grounding a spark plug in the vehicle.

* * * * *